(12) United States Patent
Spandley et al.

(10) Patent No.: US 11,319,934 B2
(45) Date of Patent: May 3, 2022

(54) BUSBARS IN A STACKING ARRANGEMENT

(71) Applicant: VESTAS WIND SYSTEMS A/S, Aarhus N (DK)

(72) Inventors: Luke Spandley, Ventnor (GB); Paul Badger, Salisbury (GB); Stephen Buggy, Cowes (GB)

(73) Assignee: VESTAS WIND SYSTEMS A/S, Aarhus N (DK)

(*) Notice: Subject to any disclaimer, the term of this patent is extended or adjusted under 35 U.S.C. 154(b) by 511 days.

(21) Appl. No.: 16/312,494

(22) PCT Filed: Jun. 29, 2017

(86) PCT No.: PCT/DK2017/050220
§ 371 (c)(1),
(2) Date: Dec. 21, 2018

(87) PCT Pub. No.: WO2018/001435
PCT Pub. Date: Jan. 4, 2018

(65) Prior Publication Data
US 2019/0145384 A1    May 16, 2019

(30) Foreign Application Priority Data
Jun. 30, 2016    (DK) .............................. PA201670482

(51) Int. Cl.
*F03D 80/40*    (2016.01)
*F03D 1/06*    (2006.01)

(52) U.S. Cl.
CPC ........... *F03D 80/40* (2016.05); *F03D 1/0675* (2013.01); *F05B 2250/311* (2013.01);
(Continued)

(58) Field of Classification Search
CPC ........ F03D 80/40; F03D 1/0675; F03D 80/60; Y02E 10/72; H05B 2203/007;
(Continued)

(56) References Cited

U.S. PATENT DOCUMENTS 5,925,275 A * 7/1999 Lawson ................. H05B 3/283
219/543
5,947,418 A * 9/1999 Bessiere ................ B64D 15/14
219/545

(Continued)

FOREIGN PATENT DOCUMENTS

EP    0732038 A1    9/1996
GB    724745 A    2/1955
(Continued)

OTHER PUBLICATIONS

Chinese Office Action dated Nov. 4, 2019 for application No. 201780050026.9.
(Continued)

*Primary Examiner* — David E Sosnowski
*Assistant Examiner* — Hakeem M Abdellaoui
(74) *Attorney, Agent, or Firm* — Patterson + Sheridan, LLP

(57) ABSTRACT

Examples of the present disclosure generally relate to wind turbine blades configured to minimize or eliminate buildup of ice on the blades. In order to maintain an ice free surface on a wind turbine blade, one or more ETH panels are embedded in the wind turbine blade to heat the wind turbine blade. One or more busbars are electrically connected to each of the one or more ETH panels for conducting electrical power to the ETH panels. The busbars may be disposed in an overlapping configuration to provide uniform heating of the wind turbine blade.

12 Claims, 6 Drawing Sheets

(52) U.S. Cl.
CPC .. *F05B 2260/221* (2013.01); *H05B 2203/007* (2013.01); *H05B 2203/013* (2013.01); *H05B 2203/016* (2013.01); *H05B 2214/02* (2013.01); *Y02E 10/72* (2013.01)

(58) Field of Classification Search
CPC .......... H05B 2203/013; H05B 2203/16; H05B 2214/02; H05B 3/03; H05B 3/267; H05B 3/146; H05B 2203/011; H05B 6/108; H05B 6/109; H05B 3/26; H05B 6/10; H05B 1/0236; H05B 2214/04; H05B 3/00; H05B 3/84; F05B 2250/311; F05B 2260/221; F05B 2260/20; B64D 15/12
USPC ....... 219/201, 202, 209, 213, 490, 494, 541, 219/553
See application file for complete search history.

(56) References Cited

U.S. PATENT DOCUMENTS

| | | | | |
|---|---|---|---|---|
| 5,971,323 | A * | 10/1999 | Rauch | B64D 15/12 219/202 |
| 6,145,787 | A | 11/2000 | Rolls | |
| 7,291,815 | B2 * | 11/2007 | Hubert | B64D 15/12 219/535 |
| 7,837,150 | B2 * | 11/2010 | Zecca | F02C 7/045 244/134 D |
| 8,710,350 | B2 * | 4/2014 | Shufflebotham | F03D 9/25 136/244 |
| 9,439,245 | B2 * | 9/2016 | Fawcett | B32B 17/10761 |
| 9,771,158 | B2 * | 9/2017 | Gilmore | H05B 3/20 |
| 10,293,947 | B2 * | 5/2019 | Hu | B64D 33/02 |
| 10,632,573 | B2 * | 4/2020 | Peltola | B23P 15/04 |
| 10,710,732 | B2 * | 7/2020 | Aubert | B64D 15/12 |
| 10,787,267 | B2 * | 9/2020 | Paulson | H05B 3/0004 |
| 2005/0257956 | A1 | 11/2005 | Marshall et al. | |
| 2007/0210073 | A1 * | 9/2007 | Hubert | B64D 15/12 219/535 |
| 2008/0099617 | A1 | 5/2008 | Gilmore et al. | |
| 2011/0038729 | A1 | 2/2011 | Shymanski et al. | |
| 2011/0290786 | A1 * | 12/2011 | Hu | B64D 33/02 219/544 |
| 2014/0241878 | A1 * | 8/2014 | Herrig | F03D 7/00 416/1 |
| 2015/0023792 | A1 | 1/2015 | Spitzner et al. | |
| 2016/0221680 | A1 * | 8/2016 | Burton | H05B 3/34 |
| 2019/0113025 | A1 * | 4/2019 | Badger | H05B 3/34 |
| 2020/0149513 | A1 * | 5/2020 | Spandley | F03D 80/60 |
| 2020/0300226 | A1 * | 9/2020 | Buggy | G01R 27/08 |

FOREIGN PATENT DOCUMENTS

| | | |
|---|---|---|
| WO | 03058063 A1 | 7/2003 |
| WO | 2018001435 A1 | 1/2018 |

OTHER PUBLICATIONS

PCT International Search Report for Application No. PCT/DK2017/050220 dated Sep. 27, 2017.
Danish Patent and Trademark Office First Technical Examination of Patent Application No. PA 2016 70482 dated Jan. 30, 2017.
PCT Written Opinion of The International Searching Authority for Application No. PCT/DK2017/050220.
Chinese Office Action for Application No. 201780050026.9 dated Jun. 23, 2020.
European Patent Office examination Report for Application No. 17 734 980.0-1007 dated Feb. 21, 2015.

* cited by examiner

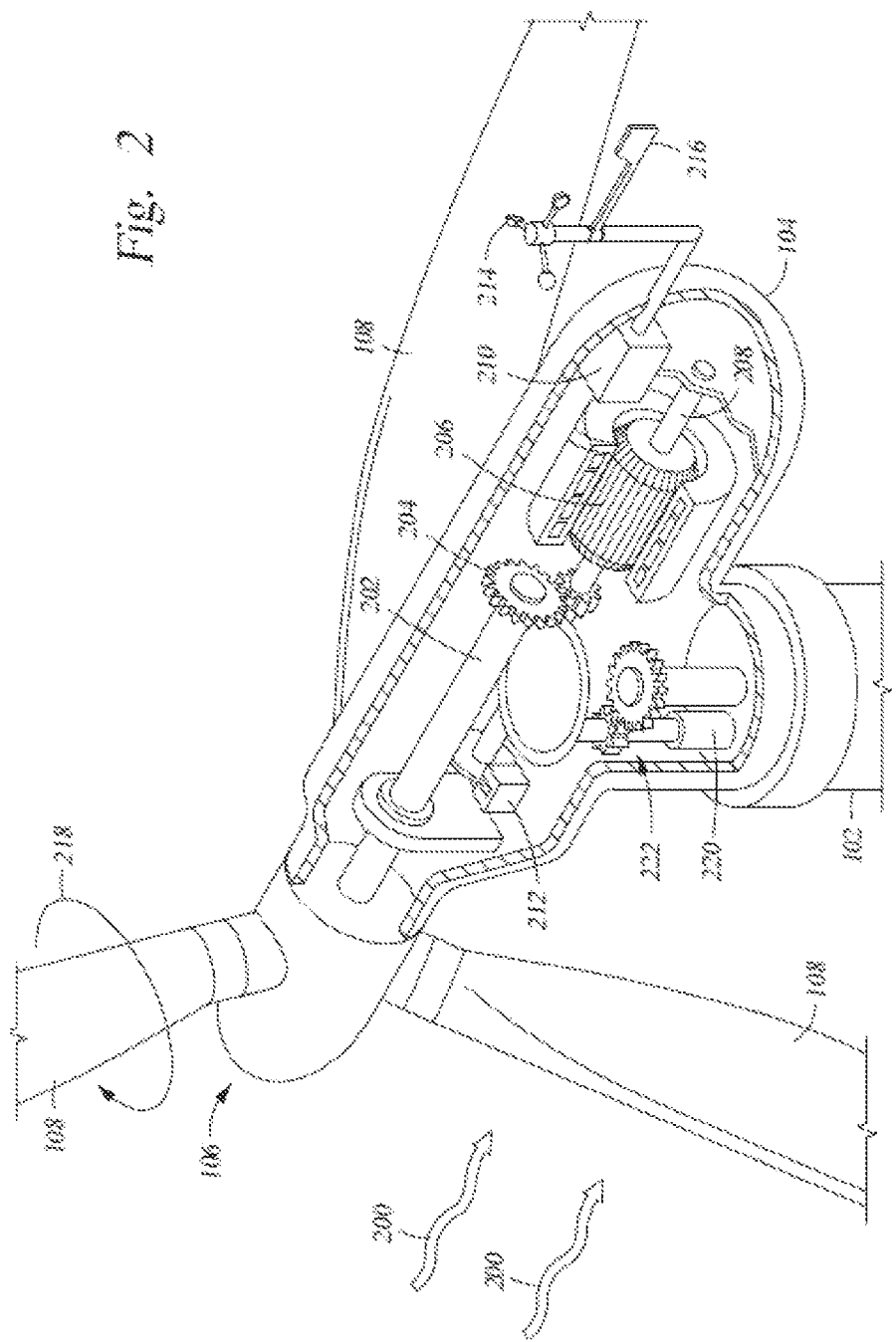

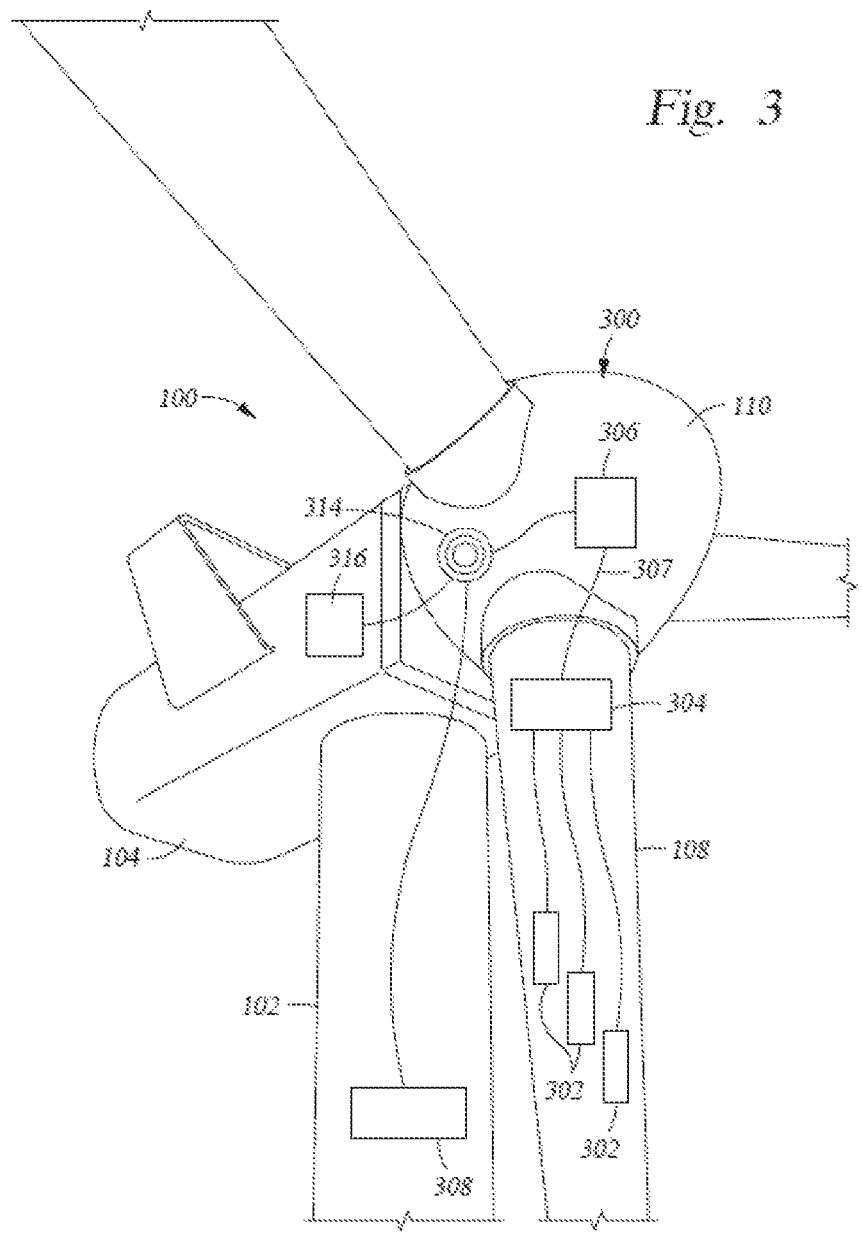

BUSBARS IN A STACKING ARRANGEMENT

BACKGROUND

Field

Examples presented in this disclosure generally relate to wind turbines, and more particularly to wind turbine blades.

Description of the Related Art

Modern power generation and distribution networks increasingly rely on renewable energy sources, such as wind turbines. In some cases, the wind turbines may be substituted for conventional, fossil fuel-based generators. The formation of ice on the surface of the blades of a wind turbine is a relatively common problem, even in moderate climates. The build-up and spread of ice on the blade surface, in particular on the tip portion of the blade, changes the blade aerodynamics and may also lead to increased vibrations and loading on the blade, all of which lead to a reduction in power output. In more severe cases, the turbine may need to be shut down upon accumulation of ice to prevent excessive loading of the blades, which may damage or prematurely fatigue the blade components.

Therefore, an improved wind turbine is needed which includes methods and apparatus for preventing accumulation of ice on wind turbine blades.

SUMMARY

According to a first aspect of the present invention there is provided a wind turbine blade, comprising: a plurality of electro-thermal heating panels disposed on or in a wind turbine blade structure; and one or more busbars electrically connected to each of the plurality of electro-thermal heating panels, wherein the one or more busbars extend along a chordwise and/or spanwise direction of the wind turbine blade, and wherein adjacent busbars are substantially aligned in the vertical direction to substantially prevent either a cold spot or hot spot in the wind turbine blade structure during heating of the wind turbine blade.

The adjacent busbars may be aligned in the vertical direction within a predetermined tolerance. The predetermined tolerance may be substantially equal to a width of a busbar. The predetermined tolerance may include a minimum and a maximum.

The minimum predetermined tolerance may equate to an outer edge of a first busbar being aligned in the vertical direction with an outer edge of a second adjacent busbar.

The maximum predetermined tolerance may equate to an inner edge of a first busbar being aligned in the vertical direction with an inner edge of a second adjacent busbar.

The wind turbine blade may further comprise an insulation layer disposed between the adjacent busbars substantially aligned in the vertical direction. The insulation layer may extend further than an outer edge and an inner edge of adjacent busbars substantially aligned in the vertical direction. The insulation layer may be made of a fire retardant material or a glass reinforced plastic.

According to a second aspect of the present invention there is provided a wind turbine generator, comprising: a tower; a nacelle connected to the tower; a hub connected to the nacelle; and one or more wind turbine blades, according to any one of the features of the wind turbine blade, connected to the hub.

BRIEF DESCRIPTION OF THE DRAWINGS

So that the manner in which the above recited features of the present disclosure can be understood in detail, a more particular description of the disclosure, briefly summarized above, may be had by reference to examples, some of which are illustrated in the appended drawings. It is to be noted, however, that the appended drawings illustrate only typical examples of this disclosure and are therefore not to be considered limiting of its scope, for the disclosure may admit to other equally effective examples.

FIG. 2 illustrates a diagrammatic view of typical components internal to the nacelle 104 and tower of the WTG of FIG. 1, according to one or more embodiments of the present invention.

FIG. 3 is a schematic view of a control system for one or more electro-thermal heating (ETH) panels inside the WTG of FIG. 1, according to one or more embodiments of the present invention.

To facilitate understanding, identical reference numerals have been used, where possible, to designate identical elements that are common to the figures. It is contemplated that elements disclosed in one example may be beneficially utilized on other examples without specific recitation.

DESCRIPTION OF EXAMPLE EMBODIMENTS

Examples of the present disclosure generally relate to wind turbine blades configured to minimize or eliminate buildup of ice on the blades. In order to maintain an ice free surface on a wind turbine blade, one or more ETH panels are embedded in the wind turbine blade to heat the wind turbine blade. One or more busbars are electrically connected to each of the one or more ETH panels for conducting electrical power to the ETH panels. The busbars may be disposed in an overlapping configuration to provide uniform heating of the wind turbine blade.

Figure 1:
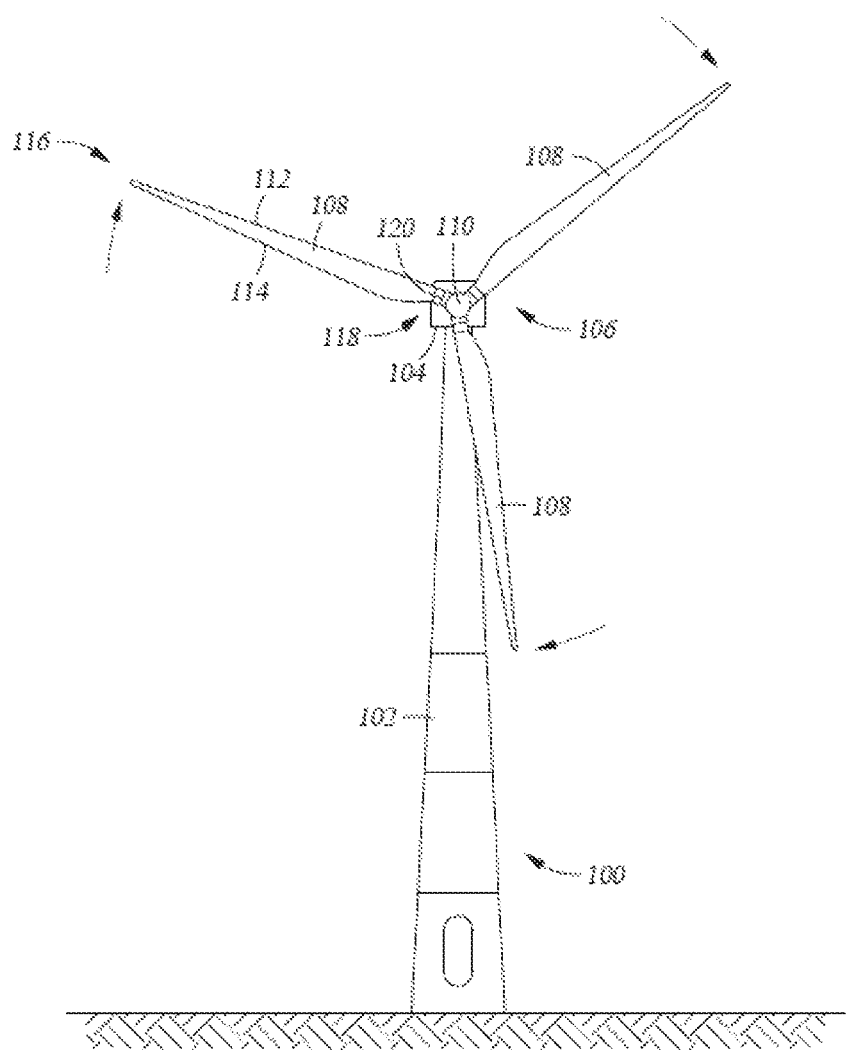
FIG. 1 illustrates a diagrammatic view of a horizontal-axis wind turbine generator (WTG), according to one or more embodiments of the present invention.

FIG. 1 illustrates a diagrammatic view of a horizontal-axis wind turbine generator (WTG) 100. The WTG 100 typically includes a tower 102 and a nacelle 104 located at the top of the tower 102. A wind turbine rotor 106 may be connected with the nacelle 104 through a low speed shaft extending out of the nacelle 104. As shown, the wind turbine rotor 106 includes three rotor blades 108 mounted on a common hub 110, but may include any suitable number of blades, such as two, four, five, or more blades. The blade 108 typically has an aerodynamic shape with a leading edge 112 for facing into the wind, a trailing edge 114 at the opposite end of a chord for the blade 108, a tip 116, and a root 118 for attaching to the hub 110 in any suitable manner. For some examples, the blades 108 may be connected to the hub 110 using pitch bearings 120 such that each blade 108 may be rotated around its longitudinal axis to adjust the blade's pitch.

FIG. 2 illustrates a diagrammatic view of typical components internal to the nacelle 104 and tower 102 of the WTG 100. When the wind 200 impacts on the blades 108, the rotor 106 spins and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206. The WTG 100 may also include a braking system 212 for emergency shutdown situations and/or to lock the rotor in a required position.

A controller 210 may sense the rotational speed of one or both of the shafts 202, 208. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

In cold climate regions, ice may form on the blades 108, which can reduce the speed of the rotation of the blades 108. In order to maintain an ice free surface on the blades 108, one or more Electro Thermal Heat (ETH) panels may be utilized. FIG. 3 is a schematic view of a control system 300 for one or more ETH panels 302 inside the WTG 100. The control system 300 may include a plurality of blade control and power distribution boxes 304, hub control and power distribution box 306, a slip ring 314, a power source 316, and a system controller 308. The one or more ETH panels 302 may be embedded in each blade 108 and may be controlled by blade control and power distribution boxes 304 located in the root 118 of each blade 108. There may be one blade control and power distribution boxes 304 for each blade 108. In one example, there are up to 32 ETH panels 302 embedded in each blade 108, such as 16 ETH panels 302 covering a windward blade surface and 16 ETH panels 302 covering a leeward blade surface. In one example, the one or more ETH panels 302 cover the entire blade 108 except for the root 118. Electrical power may be supplied to the one or more ETH panels 302 from blade power and distribution box 304 located in the blade root. The blade power and distribution box 304 may include relays for switching on and off the one or more ETH panels 302 in each blade 108. The blade power and distribution box 304 may also include lightning protection components. From the blade power and distribution box 304, power cables are routed to each ETH panel 302. In one example, the WTG 100 includes three blades and three power cables 307, and each power cable 307 connects the hub power and distribution box 306 to a corresponding blade power and distribution box 304 located in a corresponding blade 108.

The hub control and power distribution box 306 may be electrically connected a slip ring 314 located inside the nacelle 104. The slip ring 314 may be electrically connected to a power source 316 located inside the nacelle 104. The power source 316 may include a circuit breaker switch to allow the system to be de-energized. Electrical power may be supplied from the power source 316 through the hub interface of the nacelle 104 via the slip ring 314 and may be supplied to the one or more ETH panels 302 in each blade 108 via the slip ring 314, the hub control and power distribution box 306, and the blade control and power distribution box 304. The control and operation of the control system 300 may be achieved by remote connection via the system controller 308 and communication through the slip ring 314. In one example, the system controller 308 may be a standalone system. In another example, the system controller 308 may be embodied within the turbine controller. The system controller 308 may be connected to the slip ring 314 to allow communication to the hub control and power distribution box 306. Each blade control and power distribution box 304 may be electrically connected to a communication link through the slip ring 314. Control signals provided to the blade control and power distribution box 304 from the system controller 308 are communicated through the slip ring 314. In one example this may be through a wireless link. In another example this may be through and electrical or optical fibre link.

The control system 300 may utilize duty cycling (i.e., switching on and off relays over a period of time) to achieve power distribution across the one or more ETH panels 302 in each blade 108. During severe icing conditions ideally all of the ETH panels 302 embedded in the blades 108 should be switched on continuously. The slip ring 314 may have a power or current constraint which will restrict the energy drawn from the power source 316 to the ETH Panels 302. To maximize the potential power available to the ETH panels 302, the control system 300 will focus on a fixed and predetermined set of zones having combined energy consumption less than the capabilities of the slip ring 314.

Figure 4A:
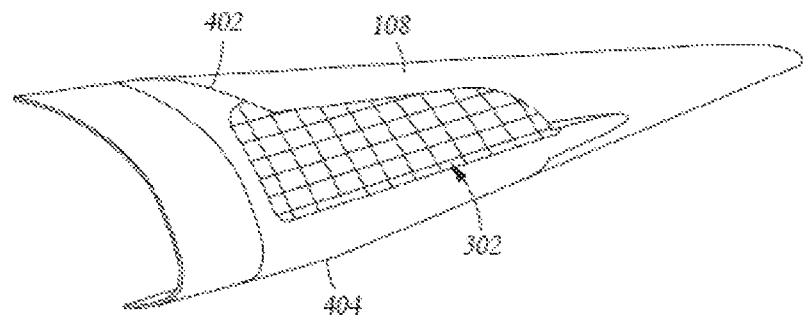
FIGS. 4A-4B are perspective views of the blade of FIG. 1, showing a portion of the embedded ETH panel, according to one or more embodiments of the present invention.

FIG. 4A is a perspective view of the blade 108 showing a portion of the embedded ETH panel 302. As shown, the ETH panel 302 may be embedded in the blade 108, such as between a first layer 402 and a second layer 404 of the blade 108. The ETH panel 302 may be any suitable resistive heating element.

Figure 4B:
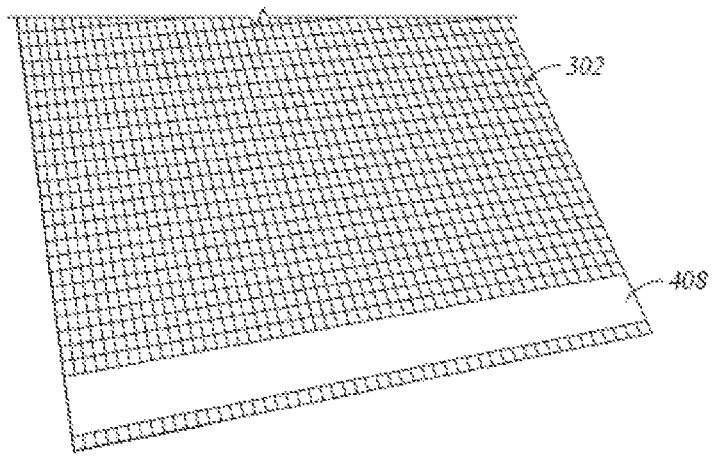

In one example, each ETH panel 302 is a carbon mesh. One or more busbars 408 are disposed across the ETH panel 302 for supplying power to the ETH panel 302, as shown in FIG. 4B. The density of the ETH panel 302 may range from about 50 g/m$^2$ to about 200 g/m$^2$. The ETH panel 302 may have a thickness in tens or hundreds of microns, such as between about 20 microns and about 100 microns. The ETH panel 302 is capable of providing a predetermined heat flux, which is determined by the electrical resistance of the material used for the ETH panel 302. The heat flux provided by the ETH panel 302 may range from about 1 kW/m$^2$ to about 20 kW/m$^2$, such as from about 2.5 kW/m$^2$ to about 5 kW/m$^2$. The ETH panel 302 may be rectangular or other suitable shape. One or more busbars 408 may be electrically connected to the ETH panel 302 for conducting electrical power to the ETH panel 302. In one embodiment, two busbars 408 are electrically connected to opposite edge portions of the ETH panel 302. The busbars 408 may extend along a width of the ETH panel 302 or extend along a length of the ETH panel 302. The busbar 408 may be made of a thin strip of conductive metal, such as copper. In one embodiment, the busbar 408 has a thickness ranging from about 20 microns to about 100 microns, such as about 50 microns.

Figure 5A:
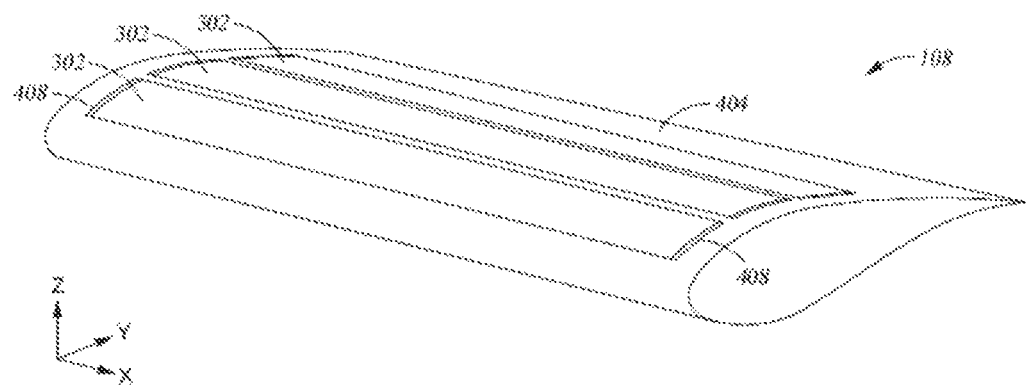
FIG. 5A-5B is a schematic perspective view of a portion of the blade including a plurality of ETH panels, according to one or more embodiments of the present invention.

FIG. 5a is a schematic perspective view of a portion of the blade 108 including a plurality of ETH panels 302, according to one example. The first layer is omitted to show the embedded plurality of ETH panels 302. As shown in FIG.

5a, a plurality of ETH panels 302 may be disposed on the second layer 404. The busbars 408 may be disposed on the ETH panels 302 in a chordwise direction of the blade 108. When power is supplied to the ETH panel 302 via the busbars 408, the ETH panel 302 is heated, but the busbars 408 and the edge portions of the ETH panel 302 connected to the busbars 408 are not heated. Thus, the ETH panels 302 may be placed next to one another along the chordwise direction without overlapping, and no cold or hot spots are formed.

Figure 5B:
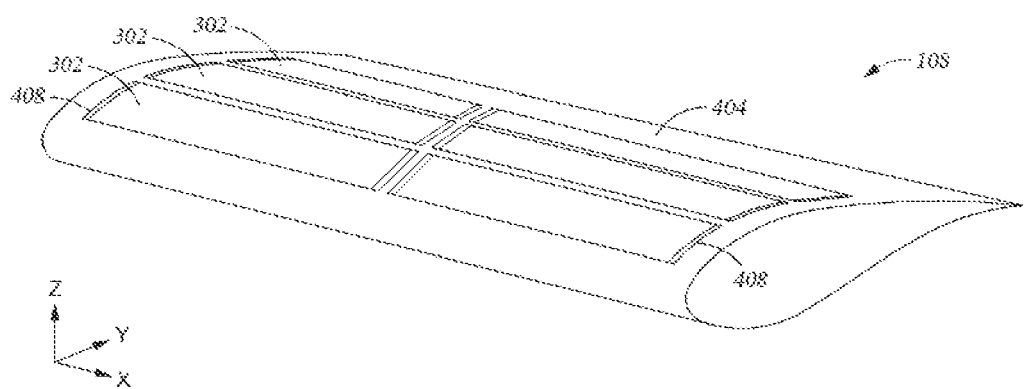

However, as shown in FIG. 5b, when placing the ETH panels 302 next to one another along the spanwise direction of the blade 108, adjacent busbars 408 can create cold spots or cold strips. For example, a cold strip having a width equal to about twice the width of the busbar 408 may form when the busbars 408 are disposed adjacent to each other. This is because the area or section of the ETH pane; directly below the busbar is heated to a substantially lesser degree than the remaining area of the ETH panel between the busbars. Therefore, if two busbars are adjacent to each other then the cold spot or cold strip will be substantially equal to the width of each of the two busbars.

Thus, overlapping of the busbars 408 and the edge portions of the ETH panels 302 may be performed in order to avoid cold spots or strips formed between adjacent ETH panels 302 in the spanwise direction. When the busbars 408 are overlapped, the area occupied by the busbars 408 is reduced by half, reducing or eliminating cold spots or strips. The overlapping of the busbars 408 and the edge portions of the ETH panels 302 are shown in FIGS. 7, 8A and 8B.

Figure 6:
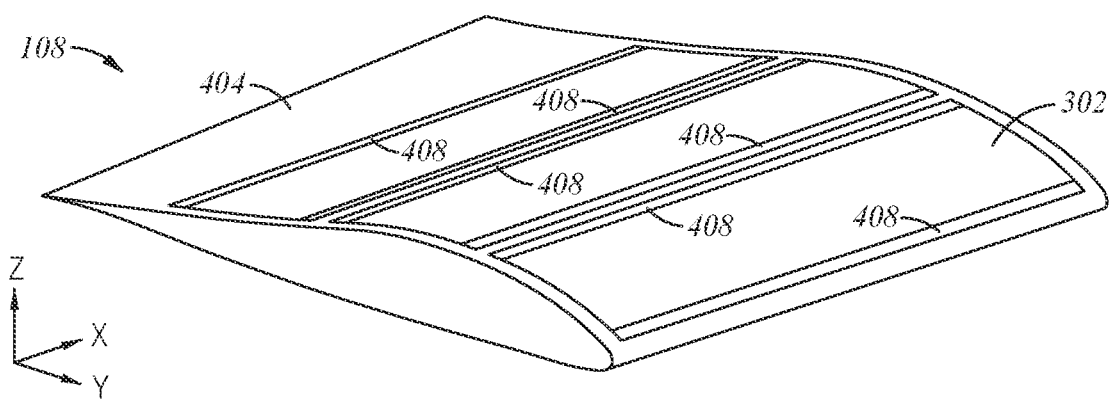
FIG. 6 is a schematic perspective view of a portion of the blade including a plurality of ETH panels, according to one or more embodiments of the present invention.

FIG. 6 is a schematic perspective view of a portion of the blade 108 including a plurality of ETH panels 302, according to one example. As shown in FIG. 6, the busbars 408 may be disposed on the ETH panels 302 in the spanwise direction, which represents the span of the blade 108. The ETH panels 302 may be placed next to one another in the spanwise direction without overlapping, and no cold or hot spots are formed. However, when placing the ETH panels 302 next to one another along the chordwise direction, as shown in FIG. 6, overlapping of the busbars 408 and the edge portions of the ETH panels 302 may be performed in order to avoid cold spots or strips formed between adjacent ETH panels 302 along the chordwise direction, for the same reasons as described hereinabove in relation to FIG. 5a.

In order to prevent cold spots or strips between adjacent ETH panels 302 either in the spanwise direction or in the chordwise direction of the blade 108, the busbars 408 of the adjacent ETH panels 302 may be overlapped or aligned in the vertical direction with one busbar directly above the other busbar.

Figure 7:
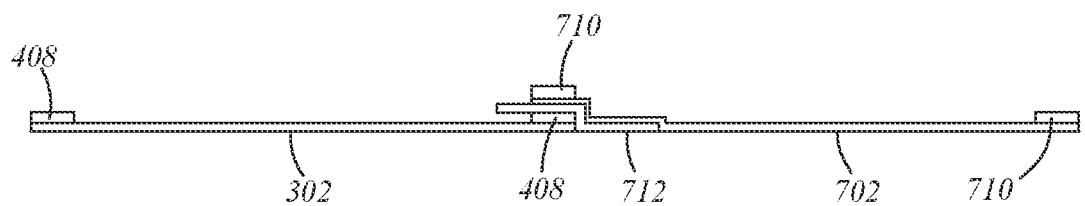
FIG. 7 is a schematic side view of a plurality of ETH panels, according to one or more embodiments of the present invention.
Figures 8A, 8B:
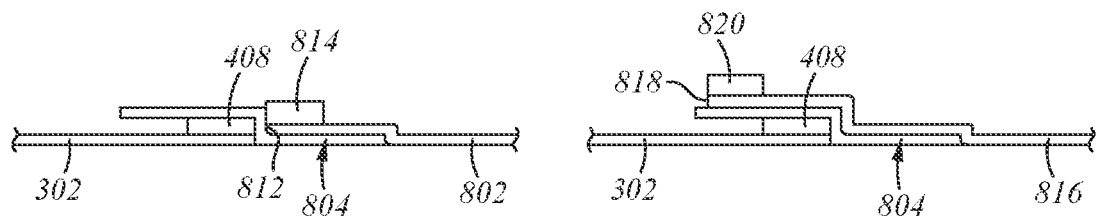
FIGS. 8A-8B are schematic side views of adjacent ETH panels, according to one or more embodiments of the present invention.

FIG. 7 is a schematic section view of a plurality of ETH panels 302, 702, 704, according to one example in which the busbars are substantially aligned in the vertical direction with one busbar directly above the other busbar. The plurality of ETH panels 302, 702, 704 are embedded in the blade 108 (FIG. 1), and components of the blade 108 are omitted in order to better illustrate the ETH panels 302, 702, 704. As shown in FIG. 7, busbars 408 may be electrically connected to opposite edge portions of the ETH panel 302. The adjacent ETH panel 702 may include busbars 710 which may be electrically connected to opposite edge portions of the ETH panel 702. In this example, the busbar 710 disposed on an edge portion of ETH panel 702 is substantially directly aligned in the vertical direction with the busbar 408 disposed on the ETH panel 302.

In order to prevent an electrical connection between the busbars of the adjacent ETH panels, an insulation layer 712 may be disposed between the two busbars 408 and 710. The insulation layer may extend past the outside edges of the two busbars respectively by a predetermined distance, for example, 10 mm or by substantially a width of a busbar. The predetermined distance of the extended insulation layer 712 allows for manufacturing tolerances to ensure there is no electrical connection between the substantially vertically aligned busbars during manufacturing and the blade layup process. The insulation layer 712 may be made of a fire retardant material, such as SE 129FRS (120 degrees Celsius TG fire retardant low smoke prepreg) available from Gurit Holding AG, located in Wattwil, Switzerland, or may be a glass reinforced plastic such as a glass fibre layer. The insulation layer 712 is of a substantially small thickness being in the region of 5 mm or between 0.2 mm and 1 mm.

The substantially vertically aligned arrangement of the busbars of adjacent ETH panels shown in FIG. 7 and described hereinabove, is the "ideal" arrangement to ensure that there are substantially no cold spots or strips and allows for a tolerance during the manufacturing or layup process of the blade. However, it has been identified that there is an allowable tolerance between a minimum and maximum arrangement of the vertical alignment of the busbars of adjacent ETH panels. FIG. 8a shows a schematic example of the minimum predetermined tolerance for the vertical alignment of the busbars of adjacent ETH panels and FIG. 8b shows a schematic example of the maximum predetermined tolerance for the vertical alignment of the busbars of adjacent ETH panels.

FIG. 8A is a schematic section view of adjacent ETH panels 302, 802, according to one example. As shown in FIG. 8A, the busbar 408 may be electrically connected to the ETH panel 302, and the ETH panel 802 may be adjacent to the ETH panel 302. An insulation layer 804 may be disposed between the busbars of the ETH panel 302 and the ETH panel 802. The insulation layer 804 may be made of the same material as the insulation layer 712. A busbar 814 may be electrically connected to an edge portion 812 of the ETH panel 802. As shown in FIG. 8A, the busbars 408, 814 are not directly aligned in the vertical direction (as shown in FIG. 7). Instead, in the arrangement of FIG. 8a, the busbars 408, 814 are arranged or positioned effectively adjacent to each other separated by the insulation layer 804. The insulation layer 804 is of a substantially small thickness being in the region of 5 mm or between 0.2 mm and 1 mm which effectively means that the outer edges of the two adjacent busbars are effectively aligned. The outer edges of the busbars are the edge of the busbar that is disposed towards the outer edge 812 of the ETH panels.

As such, the minimum predetermined tolerance is substantially equal to the width of the busbars. Taking the arrangement of the two busbars being directly vertically aligned as the reference "zero" position (as shown in FIG. 7) then the predetermined distance between the reference position and the minimum predetermined tolerance is substantially equal to the width of the busbars. In other words, the busbars have moved apart by a predetermined distance of the width of the busbars in comparison to the reference position.

The maximum predetermined tolerance for the vertical alignment of the two adjacent busbars is shown schematically in FIG. 8b where the busbars may be staggered. As shown in FIG. 8B, the busbar 408 may be electrically connected to the ETH panel 302, and an ETH panel 816 may be adjacent to the ETH panel 302. The insulation layer 804 may be disposed between the ETH panel 302 and the ETH panel 816. A busbar 820 may be electrically connected to an edge portion 818 of the ETH panel 816. As shown in FIG. 8b, the busbars 408 and 820 are not directly vertically aligned with each other (as shown in FIG. 7). Instead, in FIG. 8b the busbars 408 and 820 are positioned effectively overlapped with the inner edges of the adjacent busbars being substantially aligned and separated by the insulation layer 804. The insulation layer 804 is the same as that of FIG. 8a. The inner edges of the busbars are the edges of the busbar disposed in the direction of the centre of the ETH panels.

If the inner edges of the busbars 408 and 820 are not substantially aligned in the vertical direction then a gap is formed between the inner edges of the adjacent busbars which may cause a hot strip to be formed between ETH panel 302 and the ETH panel 816 due to overlapping areas or sections of the two ETH panels. A hot spot or strip is disadvantageous as it could cause damage to the blade structure and may even cause a fire within the blade.

As such, the maximum predetermined tolerance is substantially equal to the width of the busbars. As described hereinabove, taking the arrangement of the two busbars being directly vertically aligned as the reference "zero" position (as shown in FIG. 7) then the predetermined distance between the reference position and the maximum predetermined tolerance is substantially equal to the width of the busbars. In other words, the busbars have moved apart by a predetermined distance of the width of the busbars in comparison to the reference position.

Accordingly, in the above described examples, it has been identified that in order to prevent or reduce cold spots and/or hot spots, the busbars should be aligned in the vertical direction within an allowable predetermined tolerance. The allowable predetermined tolerance is equivalent to a width of a busbar and so any vertical arrangement of the adjacent busbars within the predetermined tolerance of a width of a busbar in either direction advantageously substantially eliminates cold spots or strips and prevents the formation of any hot spots or strips. Furthermore, the above described arrangements of the adjacent busbars advantageously ensure a substantially uniform, consistent and/or constant heating of the wind turbine blade surface.

In the preceding, reference is made to examples presented in this disclosure. However, the scope of the present disclosure is not limited to specific described examples. Instead, any combination of the preceding features and elements, whether related to different examples or not, is contemplated to implement and practice contemplated examples. Furthermore, although examples disclosed herein may achieve advantages over other possible solutions or over the prior art, whether or not a particular advantage is achieved by a given example is not limiting of the scope of the present disclosure. Thus, the preceding aspects, features, examples, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

The invention claimed is:

1. A wind turbine blade, comprising:
a first and second electro-thermal heating panel coupled to the wind turbine blade; and
a first and second busbar electrically coupled to the respective first and second electro-thermal heating panel,
wherein the first busbar and the second busbar extend along a chordwise or spanwise direction of the wind turbine blade, wherein the first busbar is disposed on the first electro-thermal heating panel, wherein an insulation layer is disposed on the first busbar such that the insulation layer extends further than an outer edge and an inner edge of the first and second busbars, wherein the second electro-thermal heating panel is disposed on the insulation layer, and wherein the second busbar is disposed on the second electro-thermal heating panel.

2. The wind turbine blade according to claim 1, wherein the first and second busbars are arranged within a predetermined vertical distance tolerance.

3. The wind turbine blade according to claim 2, wherein a maximum value of the predetermined vertical distance tolerance is equal to a width of the first or second busbar.

4. The wind turbine blade according to claim 2, wherein a minimum value of the predetermined vertical distance tolerance corresponds to a top surface of the first busbar being vertically level with a top surface of the second busbar.

5. The wind turbine blade according to claim 2, wherein a maximum value of the predetermined vertical distance tolerance corresponds to a top surface of the first busbar being vertically level with a bottom surface of the second busbar.

6. The wind turbine blade according to claim 1, wherein the insulation layer is made of a fire retardant material or a glass reinforced plastic.

7. A wind turbine, comprising:
a tower;
a nacelle disposed on the tower, the nacelle having a generator disposed therein;
a rotor connected at one end to the generator and at another end to a hub; and
a wind turbine blade connected to the hub, wherein the wind turbine blade comprises:
a first and second electro-thermal heating panel coupled to the wind turbine blade; and
a first and second busbar electrically coupled to the respective first and second electro-thermal heating panel,
wherein the first busbar and the second busbar extend along a chordwise or spanwise direction of the wind turbine blade, wherein the first busbar is disposed on the first electro-thermal heating panel, wherein an insulation layer is disposed on the first busbar such that the insulation layer extends further than an outer edge and an inner edge of the first and second busbars, wherein the second electro-thermal heating panel is disposed on the insulation layer, and wherein the second busbar is disposed on the second electro-thermal heating panel.

8. The wind turbine according to claim 7, wherein the first and second busbars are arranged within a predetermined vertical distance tolerance.

9. The wind turbine according to claim 8, wherein a maximum value of the predetermined vertical distance tolerance is equal to a width of the first or second busbar.

10. The wind turbine according to claim 8, wherein a minimum value of the predetermined vertical distance tolerance corresponds to a top surface of the first busbar being vertically level with a top surface of the second busbar.

11. The wind turbine according to claim 8, wherein a maximum value of the predetermined vertical distance tolerance corresponds to a top surface of the first busbar being vertically level with a bottom surface of the second busbar.

12. The wind turbine according to claim 7, in which the insulation layer is made of a fire retardant material or a glass reinforced plastic.

* * * * *